(12) United States Patent
Ross

(45) Date of Patent: *Jun. 26, 2001
(10) Patent No.: US 6,250,666 B1

(54) AIRBAG HOUSING WITH HORN MECHANISM

(75) Inventor: Hubert Ross, Oberursel (DE)

(73) Assignee: Breed Automotive Technology, Inc., Lakeland, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,763

(22) Filed: Jan. 26, 1999

(30) Foreign Application Priority Data

Mar. 23, 1998 (DE) .............................. 198 12 680

(51) Int. Cl.[7] .............................. B60R 21/16; H01H 9/00
(52) U.S. Cl. .................. 280/728.2; 280/731; 200/61.55
(58) Field of Search .................. 280/728.2, 731, 280/728.1; 200/61.54, 61.55, 61.56

(56) References Cited

U.S. PATENT DOCUMENTS

| | | | |
|---|---|---|---|
| 5,333,897 | * | 8/1994 | Landis et al. ................ 280/731 X |
| 5,350,190 | * | 9/1994 | Szigethy ........................ 280/731 X |
| 5,380,037 | * | 1/1995 | Worrell et al. ................ 280/731 X |
| 5,650,600 | | 7/1997 | Walters .......................... 200/61.54 |
| 5,738,369 | * | 4/1998 | Durrani .......................... 280/731 |
| 5,775,725 | * | 7/1998 | Hodac et al. ................... 280/731 X |
| 5,931,492 | * | 8/1999 | Mueller et al. ................ 280/728.2 |
| 5,950,494 | * | 9/1999 | Sugiyama ...................... 200/61.55 |
| 6,036,223 | * | 3/2000 | Worrell et al. ................ 280/731 |

FOREIGN PATENT DOCUMENTS

| | | |
|---|---|---|
| 572125 | 1/1997 | (EP). |
| WO/15431 | 4/1998 | (WO). |

* cited by examiner

*Primary Examiner*—J. J. Swann
*Assistant Examiner*—F. Zeender
(74) *Attorney, Agent, or Firm*—Lonnie R. Drayer

(57) ABSTRACT

An airbag housing can be attached to an installation supporting means on a motor vehicle. The airbag housing has on a side facing the installation supporting means at least one resilient member which is formed in one piece with the airbag housing and permits a resilient movement of the airbag housing relative to the installation supporting means.

4 Claims, 2 Drawing Sheets

AIRBAG HOUSING WITH HORN MECHANISM

FIELD OF THE INVENTION

The present invention relates to an airbag housing with an integrated horn mechanism for installation in a steering wheel.

BACKGROUND OF THE INVENTION

It is desirable that the hub cushion of a steering wheel serves as the operating button for the horn of a motor vehicle in spite of the presence of an airbag in the steering wheel. For this reason, driver's side airbag modules until now often have been assembled onto a horn mechanism arranged in the steering wheel, so that the entire airbag module serves as an operating button for the horn.

Such an arrangement of an airbag module is known, for example, from U.S. Pat. No. 5,650,600. In this arrangement, the airbag housing, which houses the gas generator and the folded together airbag, is fastened on two resilient members by means of a plurality of bolts. Insulating members are arranged between the resilient members and the airbag housing to insulate the resilient members electrically from the airbag housing. Furthermore, insulating members are provided between the bolts, by which the airbag housing is fastened on the resilient members, and the resilient members, in order to prevent electrical contact between the bolts and the resilient members. The bolts are threaded into the airbag housing from the underside and are connected to the housing in an electrically conductive manner. The bolt heads are designed as contact pins. The resilient members are welded to a contact plate, which is fastened on the steering wheel by means of threaded fasteners. The horn of the motor vehicle is operated by exerting pressure on the front panel of the airbag module and consequently on the airbag housing. Thus the resilient members are elastically deformed and the bolts designed as contact pins come into contact with the contact plate. In this way, an electrical connection between the airbag housing and the contact plate is established, which closes the horn circuit and consequently puts the horn into operation.

A further arrangement of an airbag module in combination with a horn mechanism is known from EP 0 572 125. Here, between the airbag housing and a support bracket provided on the steering wheel there are arranged compressible members that permit a resilient movement of the airbag housing in the direction of the support bracket. The airbag housing is fastened on the support bracket by means of threaded bolts, which are electrically insulated from the support bracket by additional insulating members. These bolts serve as guiding members, along which the airbag housing and support bracket can move toward each other. When there is pressure on the airbag housing as an operating button for the horn, the airbag housing and the support bracket are brought into contact with each other, whereby the horn circuit is closed and the horn is activated.

These known arrangements of an airbag module in combination with a horn mechanism all comprise a multiplicity of parts and require diverse additional insulating members. Furthermore, assembly is laborious and time intensive, since numerous threaded fasteners are employed. Assembly is additionally made more difficult by the fact that the required threaded fasteners are arranged in such a way that they are poorly accessible, so that assembly is difficult and consequently also time-intensive and expensive. The large number of parts required results not only in the additional costs for the parts but also in increased costs for storing and providing them.

SUMMARY OF THE INVENTION

It is an object of the invention to provide an improved airbag housing which can be resiliently fastened to a supporting means, or installation supporting means, on a motor vehicle and is inexpensive to produce and quick and easy to assemble.

The airbag housing according to the invention is integral with resilient members and requires no additional components for resilient mounting on a supporting means or installation supporting means on the motor vehicle. This considerably reduces the number of individual parts required, as a result of which the production, storage and assembly costs are also reduced. During assembly, the resilient, movable attachment of the airbag housing, which houses a gas generator, an airbag and a covering cap, also does not require any additional assembly parts or assembly steps in comparison with a conventional, non-resiliently fastened airbag housing. The reduction in assembly steps and individual parts also has the effect of reducing the number of possible sources of error, as a result of which the reliability of the airbag module and of the resilient mobility of the airbag housing is increased. Furthermore, the tolerances and gap dimensions are reduced, as a result of which both the function and the esthetics are improved.

The airbag housing preferably can be attached to a supporting means formed on a steering wheel of the motor vehicle. It is consequently an airbag housing for a driver's side airbag, which usually is arranged centrally in the hub portion of the steering wheel. The assembly space in a steering wheel is very restricted. Thus the arrangement of the airbag housing according to the invention is particularly favorable, since it is possible to dispense with laborious additional assembly operations for the fastening of resilient members.

The airbag housing preferably is designed as part of a switching or contact means. In such a design, the resiliently mounted airbag housing may, due to its mobility, serve as an activating member for a switching or contact means. Such a switching or contact means enables an additional function on a motor vehicle, such as, for example, the horn, to be operated by pressure on the airbag housing. Use of the airbag housing according to the invention has the effect that the number of individual parts required, and consequently also the production and assembly time, are considerably reduced, in comparison with the arrangement of conventional airbag modules in combination with contact means. As a result the production costs also can be reduced considerably. Furthermore, a reduced number of parts and simplified assembly also leads to fewer possibilities for error, as a result of which great reliability of the switching or contact means and of the airbag module is achieved.

It is particularly preferred for the contact means to operate a horn of the motor vehicle. This function is required in the case of an airbag module arranged in a steering wheel, since the driver of the motor vehicle would like to retain the accustomed operating button for the horn, usually arranged in the center of the steering wheel, even with a driver's airbag integrated into the steering wheel. Since the horn often is needed in situations of danger, a reliable function is important here, and the airbag housing according to the invention plays a part in ensuring this.

The at least one resilient member of the airbag housing preferably is designed as a tongue shaped bending bar. Such a tongue shaped resilient member advantageously is formed by a U-shaped cutout in the airbag housing. By suitable choice of the width, thickness and length as well as of the material of the tongue shaped bending bar, the desired resilient property or resilient rigidity of the resilient member can be set as desired. Such resilient members can be arranged favorably in the base plate of the airbag housing, around the gas generator. The bending bars preferably extend in the direction of the spokes of the steering wheel, so that they can be supported on the latter, which leads to a great stability of the steering wheel and of the airbag housing. The bending bars preferably are arranged uniformly in the vicinity of the circumference of the airbag housing, as a result of which a uniform and/or constant inward and outward deflection or resilient deflection respectively of the airbag module is ensured even when pressure is applied outside the center of the airbag housing.

The airbag housing preferably is fastened to the supporting means by means of clip or snap hooks. Such a design permits extremely easy assembly of the airbag housing, and consequently of the entire airbag module, on the supporting means, since the airbag housing merely has to be clipped into corresponding clearances on the supporting means. No threaded joints or other laborious assembly operations are necessary. Such clips, or snap hooks, may be designed such that they can be easily released again, even without a special tool, as a result of which easy dismantling and accessibility are made possible, for example in the case of maintenance or repair work. On the other hand, such clip or snap hooks may also be designed such that they cannot be released again without special tools, for example by arrangement in correspondingly narrow clearances which are not accessible without a tool. In this way it can be ensured that an airbag module with the airbag housing according to the invention cannot be removed by unauthorized persons.

The clip or snap hooks advantageously are formed in one piece with the airbag housing, and may be elastically deformed during clipping, due to the elasticity of the housing material. The clip or snap hooks may be produced at the same time as the production of the airbag housing, with the resilient members formed thereupon, for example during molding or casting. Consequently, no additional fastening members have to be attached to the airbag housing. As a result, time saving and low cost production of the airbag housing with the required fastening members is possible in one operation.

The airbag housing preferably consists of plastic. This permits simple production, for example by injection molding, as a result of which even airbag housings of a complicated shape can be produced easily. Plastic also allows the required elasticity of the resilient members formed in one piece with the airbag housing. The required elasticity of possible clip or snap hooks for securing the airbag housing also can be produced easily in the case of an airbag housing made of plastic, so that easy and reliable assembly of the airbag housing is possible. Furthermore, a plastic housing has a low weight, which is increasingly more important in modern vehicle construction. In combination with an electrical contact means, the plastic housing has the further advantage that it is possible to dispense with additional insulating members.

The airbag housing may also consist of metal, in particular of cast lightweight metal. Preferred lightweight metals are, for example, aluminum, magnesium or alloys of these materials. Such an airbag housing is extremely stable and can easily absorb the forces occurring during unfolding of the airbag. Furthermore, a metal airbag housing has a greater thermal stability, which is advantageous in particular during inflation of the airbag, since a great heat may occur in that case around the gas generator. By casting, even airbag housings of a complicated shape can be produced from metal easily and, in particular in the case of large quantities at low cost. Cast lightweight metal has the additional advantage of low weight. In particular in combination with an electrical contact means, the use of an airbag housing made of metal may be of advantage, since it is possible to dispense with additional electrical contact members.

On the airbag housing there preferably is provided at least one electrically conductive contact member, that is facing the supporting means and, in particular, a contact region provided on the latter. Such an electrically conductive contact member increases the reliability of an electrical contact between the airbag housing and the supporting means. In particular, when the airbag housing is used in combination with an electrical contact means, consequently a reliable function of this contact means with little susceptibility to faults can be ensured. In the case of an airbag housing made of plastic, such an electrically conductive contact member is required if the airbag housing is to serve as an electrical contact or electrical conductor. On account of the resilient mobility of the airbag housing with respect to the supporting means, such a contact member may serve in combination with a contact region provided on the supporting means as a button or switch for operating an electrical means, such as for example the vehicle horn.

The airbag housing preferably has guiding members for guiding the airbag housing in its resilient movement. A reliable movement of the airbag housing along a predetermined path can be ensured by such guiding members, even if force is introduced obliquely or asymmetrically. The guiding members have the effect of preventing the airbag housing from tilting and/or canting and/or jamming during its movement, which can easily occur in particular if force is applied off-center. The function of the guiding members is advantageously assumed by the fastening members, and in particular the clip or snap hooks by which the airbag housing is fastened on the supporting means on the motor vehicle. Consequently, there is also no necessity for additional guiding members, which leads to a further reduction in the number of individual parts required.

BRIEF DESCRIPTION OF THE DRAWINGS

The airbag housing according to the invention is described by way of example below with reference to the attached figures, in which.

DETAILED DESCRIPTION OF THE INVENTION

Figure 1:
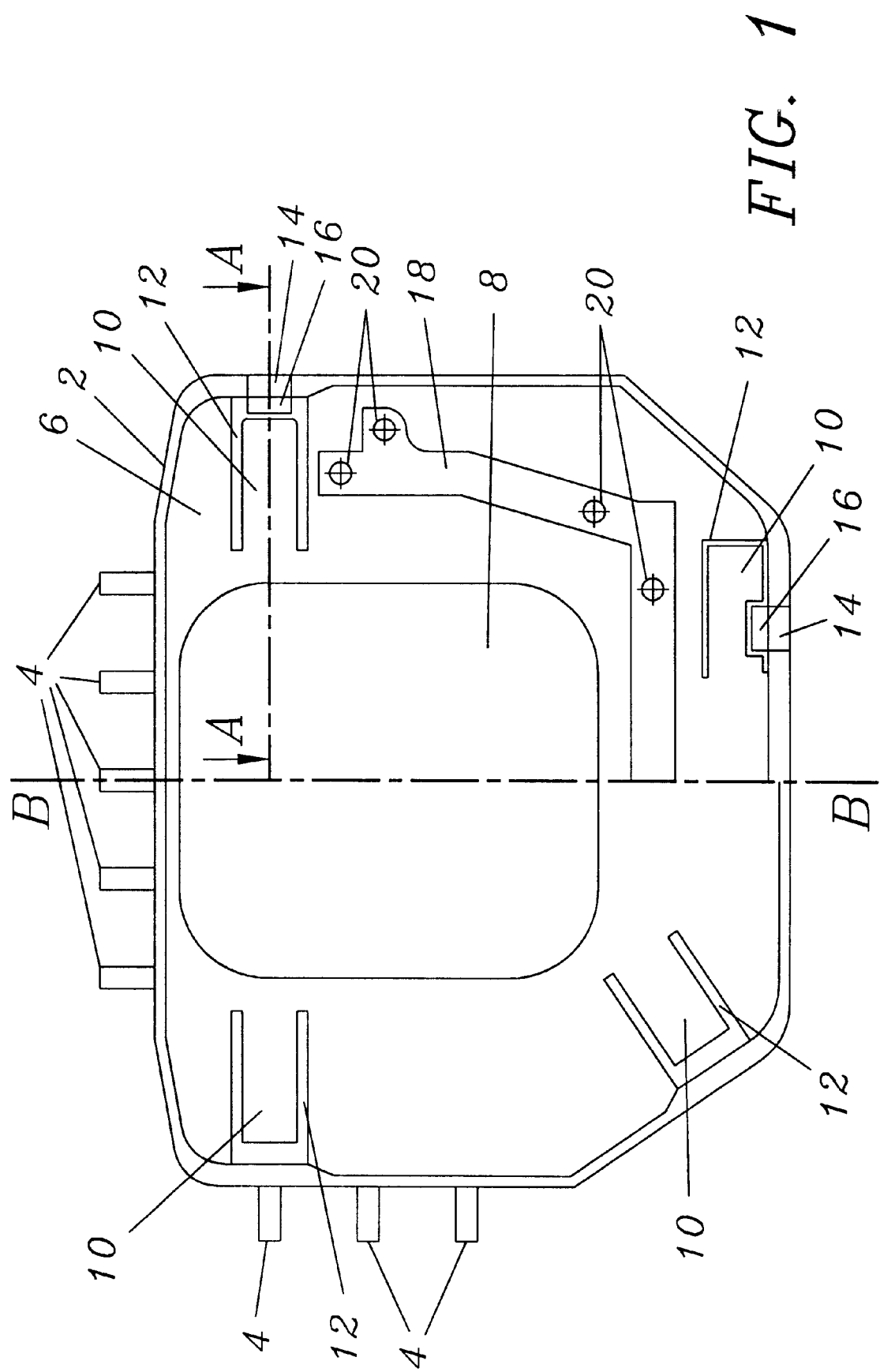
FIG. 1 shows a plan view of the underside of the airbag housing according to the invention.

FIG. 1 shows a plan view of the underside of the airbag housing 2 according to the invention. The airbag housing is designed symmetrically with respect to the axis of symmetry B—B, but here different embodiments are represented on either side of the axis of symmetry.

The housing has a substantially hexagonal basic shape, but may also have other shapes, adapted to the respective application. On its circumference, the airbag housing 2 has projections 4, on which the airbag and/or the covering cap of the airbag module can be fastened. In approximately the center of the base plate 6 of the airbag module 2, a gas generator 8 is arranged with its fastening flange. Different possibilities for the arrangement of the resilient members 10 are shown to the left and right of the axis of symmetry B—B of the airbag housing 2. The arrangement of the resilient members 10 is dependent, in particular, on the installation location of the airbag housing 2 and the position and size of the gas generator 8. The airbag housing 2 shown here is an airbag housing 2 for a driver's airbag module, i.e. it is intended for installation into a steering wheel. In this case, the arrangement of the resilient members 10 preferably is designed such that the resilient members 10 are supported on the spokes of the steering wheel and, in particular, on their stable skeleton. This achieves the effect that the resilient members 10 have a stable support on the steering wheel, since the spokes usually consist of a metal skeleton which is sheathed in a softer plastics material.

The resilient members are designed in the form of bending bars or elastic tongues. These tongue shaped resilient members 10 are produced in the base plate 6 of the airbag housing 2 by U-shaped cutouts 12. In addition to the elasticity of the material of the airbag housing, the resilient properties of these resilient members 10 are determined in particular by the free length, the thickness and the width of the tongues. The airbag housing 2 shown here is preferably produced from plastic, so that the tongues can be formed easily, for example, during the injection molding of the airbag housing 2.

The housing may, however, also be produced from another material, in particular from cast lightweight metal. Here too, easy formation of the tongue shaped resilient members 10 is possible. Suitable lightweight metals are, for example, aluminum, magnesium or alloys of these metals.

On the right hand side of the shown airbag housing 2 clip hooks 14 are shown, by means of which the airbag housing 2 can be fastened by clipping to a supporting means in the form of corresponding clearances on the steering wheel skeleton. The clip hooks 14 are arranged such that they are distributed as uniformly as possible around the circumference of the base plate 6 of the airbag housing 2 to ensure stable fastening of the airbag housing on the steering wheel. The clip hooks 14 additionally serve as guiding members in the resilient movement of the airbag housing with respect to the steering wheel. For this reason as well, the arrangement of the clip hooks 14 on the circumference of the base plate 6 is preferred, since in this way any jamming or tilting of the airbag housing during its movement is avoided, particularly if there is pressure on the edge region. The clip hooks 14 are arranged such that their clip projections 16 extend into the U-shaped cutout 12 for the resilient members 10. This is particularly favorable since this avoids additional undercuts or clearances for forming the clip projections 16 in the airbag housing 2. Such undercuts or clearances are problematic specifically in the case where the airbag housing 2 is produced by molding or casting, such as for example injection molding or die casting, and lessen the stability of the airbag housing 2. The arrangement of the clip projections 16 in the region of the U-shaped cutouts 12 makes it possible to dispense with additional slides during molding or casting, since no undercuts occur and consequently the clip hooks 16 can be formed completely with the airbag housing 2 by two molds.

On the right hand side of the airbag housing 2 represented in FIG. 1 there is also shown a contact member 18. The contact member 18 extends substantially as a U-shaped strip along three sides of the gas generator 8. The contact member 18 is provided to be brought into contact with a corresponding contact region on the opposite supporting means, and consequently to close a horn circuit, during the resilient movement of the airbag housing 2. Pegs or spigots 20 are provided on the airbag housing 2 for fastening the contact member 18 to the airbag housing 2. The pegs or spigots 20 extend through corresponding holes in the contact member 18 and are deformed after the contact member 18 is fitted on in order to hold the latter. In the case of an airbag housing 2 made of plastic, the pegs 20, formed in one piece with the airbag housing 2, can be easily deformed by heating and pressure in such a way that they form heads which have a larger diameter than the holes in the contact member. The contact member 18 is permanently connected, i.e. not releasable without destruction, to the airbag housing 2 by means of the pegs 20. The contact member 18 may, however, also be fastened on the airbag housing 2 in some other way, for example by adhesive bonding, screwing, riveting, welding, molding or casting in or clipping. The contact member 18 shown here is essentially a smooth strip of metal, but may also have a profiled shape in order to form individual contact points. The strip of metal of the contact member 18 preferably is arranged in the vicinity of the circumference of the base plate 6 of the airbag housing 2. A reliable contact can be achieved if there is pressure on virtually any desired point of the airbag housing 2. Specifically a large operating button for the horn, which is formed here by the covering panel of the airbag module, is rarely pressed exactly in its center, but rather in the edge region, since this is closest to reach with the hands from the rim of the steering wheel. In the case of such operation, it can be achieved by designing the contact member 18 such that it covers as large a surface area as possible that the horn is reliably operated if there is pressure on any point of the covering panel of the airbag module. Furthermore, a connection member, not shown here, is provided on the contact member 18 for connecting to an electrical connection cable.

Figure 2:
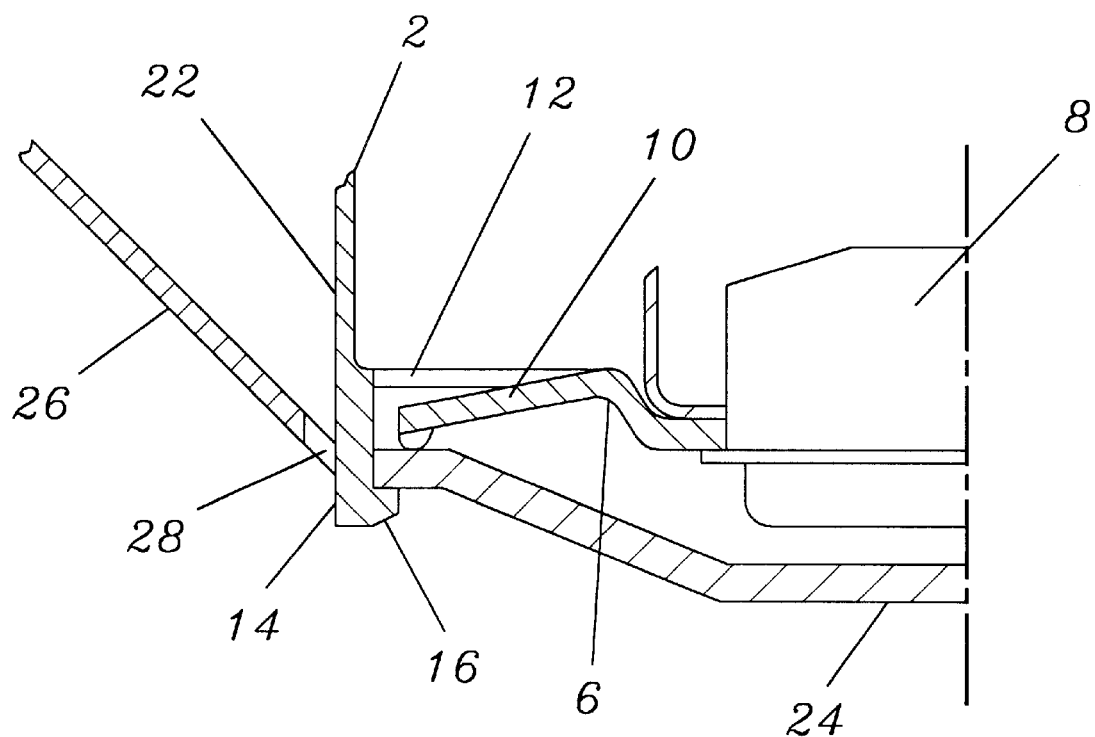
FIG. 2 shows a sectional view along the line A—A in FIG. 1.

FIG. 2 shows a cutout of a sectional view along the line A—A in FIG. 1. The airbag housing 2 comprises a base plate 6, into which the gas generator 8 is fitted. From the base plate 6, side walls 22 extend approximately at right angles with respect to the base plate 6 upward, i.e. away from the base plate 6 and the steering wheel 24 in the direction of the driver of the motor vehicle. Formed in the base plate 6 is a resilient member 10, in the form of a tongue-shaped bending bar, which extends from its point of articulation on the base plate 6 obliquely away from the latter. The airbag housing 2 is fastened on a disk shaped hub 24 of the steering wheel. From the hub 24 there extend spokes 26 to the rim, not shown, of the steering wheel. The clip hooks 14 extend at approximately at right angles with respect to the base plate 6, from the latter in extension of the sidewalls 22 in the direction of the hub 24 of the steering wheel.

The clip hook 14 penetrates through a clearance 28 in the hub 24 of the steering wheel. In this case, the clip projection 16 engages behind the hub 24. When the airbag housing 2 is fitted into the steering wheel, the clip hook 14 is bent back elastically, due to the beveling of the clip projection 16. During assembly the clip projection 16 can be passed through the clearance 28 and then, after bending back of the clip hook 14 it engages behind the hub 24. During this assembly, the resilient member 10 is at the same time elastically deformed, so that it bears under tension against the side of the hub 24 opposite the clip projection 16. As a result, a pretension is produced and the clip projection 16 is held in contact with the hub 24. If there is a pressure on the covering panel of the airbag module (not shown here), the base plate 6 moves toward the hub 24, the resilient member 10 being further bent elastically in the direction of the base plate 6 and the clip hook 14 being pushed further through the opening 28, the clip projection 16 coming out of contact with the hub 24. If the covering panel of the airbag module is released again, the airbag housing 2 will move back, due to the spring tension of the resilient member 10, to such an extent that the clip projection 16 again comes into contact with the hub 24. The clip hook 14 serves during this movement at the same time as a guide, since it is guided in the opening 28. For operating a horn, there is attached a contact member 18, shown in FIG. 1 to the underside of the base plate 6 so that the contact member 18 can be brought into contact with the hub 24, or a further contact member fastened on the hub 24, by movement of the airbag housing 2. If the hub 24 consists of metal, a further contact member is not absolutely necessary, but instead the hub 24 can itself serve as a contact member. In the event that the hub 24 consists of a material that is not electrically conductive, or to improve the electrical conductivity, an additional contact member may be attached to the hub 24. This contact member may be fastened on the hub 24, for example, by adhesive bonding, but also by screwing, riveting, welding or other methods of fastening. The contact member may be designed as a smooth metal sheet, but preferably has raised contact points, which permit more favorable contact with the contact member 18. Such raised contact points easily can be produced in a metal sheet by deforming.

It can also be seen in FIG. 2 that the clip projection 16 of the clip hook 14 extends under the region of the U-shaped clearance 12. This design avoids an undercut, which would lead to problems in the production of the airbag housing 2 by molding or casting techniques. In the present design, a mold can extend through the U-shaped clearance 12 up to the clip projection 16. It is possible for the mold to be drawn out from the U-shaped groove 12 linearly in the direction of the sidewall 22 after curing of the material of the airbag housing 2. This design consequently permits simple production of the airbag housing 2. No additional slides or other measures for forming undercuts are required during the injection molding or die-casting and the airbag housing 2 does not have to be weakened by further clearances.

Many changes and modifications in the above described embodiment of the invention can, of course, be carried out without departing from the scope thereof. Accordingly, that scope is intended to be limited only by the scope of the appended claims.

What is claimed is:

1. An airbag housing mounted to a hub portion of steering wheel so that motion of the housing activates a motor vehicle horn, comprising:

the steering wheel hub having an upwardly facing surface and a downwardly facing surface, the steering wheel hub having portions defining a plurality of spaced apart clearances, which provide access to the downwardly facing surface, the portions of the steering wheel hub through which the clearances extend, forming guided surfaces;

the airbag housing having a baseplate, the baseplate mounted to the steering wheel hub by a plurality of spaced apart clip hooks integrally formed with the baseplate, the clip hooks extending downwardly through the spaced apart clearances, each clip hook having a clip projection which engages the downwardly facing surfaces of the steering wheel hub;

a gas generator for inflating an air bag, the gas generator being mounted to the baseplate; and a plurality of resilient members integrally formed with the baseplate, and positioned opposite the integrally formed hooks, the resilient members biasing the baseplate away from the steering wheel hub, each resilient member is a tongue-shaped bending bar formed in one piece with the airbag housing positioned between the gas generator and an outer edge of the airbag housing, each resilient member extends in a radial direction outward from a side of the gas generator towards a spoke of the steering wheel.

2. The a bag housing of claim 1 further comprising:

at least one electrically conductive contact member, which is facing a contact region on the hub.

3. The airbag housing of claim 1 wherein the resilient member is formed by a U-shaped cutout in the air bag housing.

4. An airbag housing, and gas generator comprising: the housing formed as an integral molded part of resilient material; a baseplate, forming an integral portion of the housing; the gas generator for inflating an air bag, the gas generator being mounted to the baseplate;

a plurality of clip hooks, integrally formed with the housing, each clip hook having a clip projection, extending inwardly toward the baseplate; and a plurality of resilient members, each resilient member being formed as part of the baseplate, each resilient member being formed by portions of the baseplate defining a U-shaped opening, each resilient member being positioned above and adjacent to a corresponding one of the said plurality of clip hooks, the U-shaped openings defining each of said resilient members, said U-shaped opening overlies the clip projection of the adjacent clip hook, so that the clip projections can be formed in a molding operation without additional undercuts for forming the clip projections, each resilient member is a tongue-shaped bending bar formed in one piece with the airbag housing positioned between the gas generator and an outer edge of the airbag housing, each resilient member extends in a radial direction outward from a side of the gas generator towards a spoke of a steering wheel.

* * * * *